United States Patent [19]

Siefer et al.

[11] Patent Number: 5,153,386
[45] Date of Patent: * Oct. 6, 1992

[54] DIGITIZER TABLET WITH ILLUMINABLE WORKING SURFACE

[75] Inventors: David A. Siefer, Orange; Alexander M. Purcell, Wallingford, both of Conn.

[73] Assignee: Summagraphics Corporation, Seymour, Conn.

[*] Notice: The portion of the term of this patent subsequent to Jul. 2, 2008 has been disclaimed.

[21] Appl. No.: 648,123

[22] Filed: Jan. 30, 1991

Related U.S. Application Data

[63] Continuation-in-part of Ser. No. 463,612, Jan. 11, 1990, Pat. No. 5,028,744, and a continuation-in-part of Ser. No. 350,042, May 10, 1989, abandoned, which is a continuation of Ser. No. 634,951, Dec. 28, 1990, abandoned.

[51] Int. Cl.$^5$ ............................................... G08C 21/00
[52] U.S. Cl. ...................................... 178/18; 178/19; 340/712; 340/716; 362/33; 362/97
[58] Field of Search .................... 178/18, 19, 20; 340/712, 716; 362/33, 97

[56] References Cited

U.S. PATENT DOCUMENTS

| | | | |
|---|---|---|---|
| 4,206,314 | 6/1980 | Prugh et al. | 178/19 |
| 4,532,395 | 7/1985 | Zukowski | 200/314 |
| 4,654,762 | 3/1987 | Laverick | 362/97 |
| 4,672,153 | 6/1987 | Kikuchi | 178/18 |
| 4,723,836 | 2/1988 | Kono et al. | 340/707 |
| 4,730,186 | 3/1988 | Koga et al. | 178/118 |
| 4,812,831 | 3/1989 | Laier | 341/31 |
| 4,943,689 | 7/1990 | Seifer et al. | 178/18 |
| 5,028,744 | 7/1991 | Purcell et al. | 178/18 |

OTHER PUBLICATIONS

ID: The Intelligent Digitizer Advertisements of Summagraphics Corporation.
Drawing of ID Translucent Tablet, Ref. SCG-380.
BYTE Magazine, Jan. 1989, pp. 162-174.

*Primary Examiner*—Stafford D. Schreyer
*Attorney, Agent, or Firm*—Rosen, Dainow & Jacobs

[57] ABSTRACT

A digitizer tablet is provided in which the working surface is illuminated by a light source which includes optical structure located over the grid or electrode array of the position determining structure of the digitizer to provide a surface-lit tablet, or beneath the grid or electrode array to provide a back-lit tablet. Preferably, a space is provided adjacent the working surface to reduce undesirable lighting effects. A fiber optics panel or an electroluminescent panel may be used as the optical structure placed above or beneath the grid to illuminate the working surface. The position determining structure and the optical structure may be integrated into a single unit to form a digitizer with an illuminated working surface, or the optical structure may be provided as a separate unit for use with a digitizer to provide an illuminated working surface for the digitizer.

28 Claims, 4 Drawing Sheets

DIGITIZER TABLET WITH ILLUMINABLE WORKING SURFACE

This application is a continuation-in-part of commonly-assigned applications, Ser. No. 07/463,612, filed Jan. 11, 1990, entitled "DIGITIZER WITH ILLUMINABLE WORKING SURFACE", now U.S. Pat. No. 5,028,744 and Ser. No. 07/350,042, filed May 10, 1989, abandoned entitled "SURFACE LIGHTED DIGITIZER", which is a continuation of application Ser. No. 07/634,951, filed Dec. 28, 1990, now abandoned, the disclosures of which are incorporated herein by reference.

BACKGROUND OF THE INVENTION

The invention disclosed in this application relates to digitizer tablets and tablet structures have a working surface which may be illuminated. For example, the digitizer tablet may be a back-lighted or surface-lighted digitizer tablet, or the digitizer tablet may be translucent and back lighted by an external light source such as a light box, or the digitizer tablet structure may form part of a back-lighted or surface-lighted tablet, etc.

Digitizer tablets and their use are well known. See, for example, BYTE magazine, January, 1989, pages 162-174. In certain applications, illumination of the working surface is highly desirable. This is particularly true of applications that require accurate tracing of drawings, prints, photographic images such as radiology, etc., and CAD applications. Frequently such applications require a large tablet, e.g., one having a 36×48 inch working surface.

An illuminated digitizer working surface may be provided in a number of ways. For example, digitizer tablet structure including a grid or equivalent structure which functions as part of the position determining portion of the digitizer may be back lighted. A back-lightable, translucent digitizer tablet (including grid structure) is disclosed in U.S. Pat. No. 4,206,314 (Prugh et al.). A back-lighted digitizer device is disclosed in U.S. Pat. No. 4,943,689, of Siefer and Purcell, which is assigned to the assignee of this application. The back-lighted digitizer device disclosed in the '689 patent includes a translucent digitizer tablet supported over a lighting compartment in which fluorescent lamps are mounted for back lighting the digitizer tablet.

The working surface of a translucent and back-lighted digitizer tablet or tablet structure may show undesirable lighting effects such as patterns, lines or spots which may detract from or interfere with use of the digitizer. One reason is that the light which illuminates the working surface is projected through the entire digitizer tablet or tablet structure including the grid or equivalent structure, which, in the case of electromagnetic digitizers, includes a shield spaced from grid wires of the grid structure. Another reason, as discovered by the applicants herein, is that structure causing such undesirable lighting effects projects images which are focussed at or near the illuminated working surface.

The Prugh et al. '314 Patent discloses neither the problem of undesirable lighting effects at the illuminated working surface of a back-lighted or translucent digitizer tablet, nor a solution.

The Siefer and Purcell '689 patent discloses a digitizer tablet structure which eliminates many undesirable lighting effects of a back-lighted digitizer device. Specifically, the '689 patent discloses an electromagnetic digitizer tablet comprising a sandwich tablet structure which diffuses light projected to, and/or defocuses any imaging of the electromagnetic grid structure on, the top working surface of the digitizer tablet, so that any such imaging is barely, if at all, noticeable at a typical user's distance of about 18 inches. Included in the sandwich structure is a clear or transparent spacer disposed between the grid structure and the working surface of a translucent top element.

However, even in the back-lighted digitizer device disclosed in the Siefer and Purcell '689 patent, undesirable lighting effects such as uneven illumination of the tablet's working surface may occur. Furthermore, moisture or liquids used during manufacture or use may accumulate between the clear or transparent spacer and the top translucent element, which may produce further undesirable lighting effects, such as dark, bubble-shaped patterns, from ambient light reflected from the surface, and bright bubble-shaped patterns from light emitted by the light source through the working surface. Also, pressure applied to the working surface from a stylus, cursor or a writing instrument or from a user leaning on the working surface, from heavy objects placed on the working surface, or from the weight of the tablet elements themselves, may cause temporary or permanent local deformation of elements of the digitizer tablet, which may also cause undesirable lighting effects.

There is thus a need to improve the illumination of the working surface of digitizer tablets and like structures.

SUMMARY OF INVENTION

An object of the invention disclosed herein is to improve the illumination of the working surface of a digitizer tablet or digitizer tablet structure, or like structure, e.g., by providing substantially uniform illumination of the working surface, by eliminating undesirable lighting effects, etc.

It is another object of the invention to provide such improved illumination in a back-lighted and/or surface-lighted type of digitizer tablet.

It is another object of the invention to provide a digitizer tablet or digitizer tablet structure, or like structure, having a working surface that may be illuminated by back or surface lighting, in which illumination of the working surface is improved.

In the description that follows hereinafter, digitizer tablets are characterized as back-lit or surface-lit depending upon whether the light that illuminates the working surface is transmitted to the working surface through the position determining structure. When the light originates at a location below the position-determining structure, typically a grid array, it is characterized as back-lit; when the light is projected to the working surface from above the position-determining structure or from between the position-determining structure and the tablet working surface, it is characterized as surface-lit.

According to one aspect of the invention, space is provided in a digitizer tablet or digitizer tablet structure between the working surface and a source of light for illuminating the working surface. Preferably, the space is immediately adjacent a translucent top layer or element (light-transmitting layer) whose top surface is the working surface. Such a space is preferably an air gap, although it may receive other fluids or a vacuum may be formed in the space. The space acts to defocus and/or diffuse light passing through the space, and thereby eliminates or minimizes undesirable lighting effects resulting from one or more of the causes described herein. The thickness of the space is substantial, and depends upon optical and non-optical factors. By substantial it is meant that the space is sufficiently large to achieve one or more of the functions attributed hereto to the space, e.g. large enough so that moisture which may normally accumulate in use does not bridge the space. At the same time, the space should not be unduly large in view of the overall tablet size, thickness of other tablet layers and components, so as to adversely affect so-called "threshold proximity" of a pointer or probe, e.g., stylus or cursor (movable object), of the position-determining portion of the tablet.

For example, an air gap of 0.060 inches adjacent a translucent acrylic top layer of 0.375 thickness has been found to substantially eliminate or minimize one or more of the undesirable lighting effects described herein. However, an air gap or a space of from about 0.030 inch to about 1.0 inch or larger will result in substantial elimination or minimization of undesirable lighting effects from one or more of the causes described herein.

Non-optical factors to be considered in selecting the thickness of the space include mechanical considerations, e.g., support, rigidity, weight, etc.; electrical considerations, e.g., shielding requirements in an electromagnetic type digitizer, proximity threshold of the stylus or cursor to the working surface, etc.; cost; digitizer tablet size; etc.

For many applications, the top element must be supported other than at its perimeter. In accordance with the invention, such support is provided in the space by at least one spacer element (spacer means) which does not introduce substantial undesirable lighting effects. Such spacer elements in accordance with an embodiment of the invention are preferably elongated, or have the effect of an elongated spacer, e.g., a series of smaller spacers, have a cross-sectional area small in comparison to the area of the working surface, and are optically transmissive transversely to a longitudinal axis of the respective elongated element. By small, it is meant that the spacer elements occupy, say, less than 10% of the volume of the space. One or more of such spacer elements are disposed extending below and adjacent the top element, i.e., the longitudinal axis of the elongated spacer element or elements is substantially parallel to the plane of the top layer. Thus, a substantial portion of the space remains unoccupied by such elements, with small portions only occupied by one or more of these light-transmissive spacer elements.

Preferably, the elongated spacer elements have a cylindrical outer surface, i.e., they are tubular or rod-like. Cylindrical outer surfaced spacer elements have the advantage of making line or point contacts with the under side of the top layer, thereby maximizing the volume of the space and reducing the area of contact of the top layer with any elements which may optically be imaged at the working surface, and also avoiding the possibility of forming small air gaps between a spacer element and the top layer. Preferably, the cylindrical outer surfaced spacer elements are substantially non-compressible to minimize contact with the top layer.

In accordance with preferred embodiments, the elongated elements are conventional, transparent optical fibers or solid transparent rods of acrylic, glass, etc.

According to one embodiment in accordance with this aspect of the invention, a tablet structure is provided which includes position-determining structure (e.g. a grid structure), a top (light-transmitting) translucent element or layer, and an air gap between the position determining structure and the top translucent layer. Preferably, the air gap is immediately adjacent the top layer. The tablet structure in one embodiment is substantially translucent and back-lightable, i.e., a light source (or the tablet structure) may be disposed so that light is projected to the top layer through the position determining structure. Such a back-lightable tablet structure may be provided as a translucent stand-alone digitizer tablet without a light source, i.e., requiring an external light source, or as part of an integrated, back-lighted digitizer tablet which includes a light source. The translucent digitizer tablet (without integrated light source) may be placed over an external light source as, for example, a light box, light table or an X-ray illuminating device. When forming part of a back-lighted digitizer tablet, the digitizer tablet structure may be connected to a light box device as generally described, for example, in the Siefer and Purcell '689 patent, the disclosure of which is hereby incorporated herein by reference.

In specific embodiments, a light panel is used to provide lighting for the working surface of the tablet. By light panel is meant an electrical or optical device which provides light over a wide area, preferably coextensive with the working surface of the tablet. The light panel can be positioned below or above the position-determining structure. Since, however, light panels are available with a relatively small thickness, it is preferred to mount the light panel above the position-determining structure without sacrificing proximity requirements. Suitable light panels are available as electroluminescent (EL) panels, wherein the light is generated within the panel, or as optical fiber panels, which spread out and direct toward the working surface light originating from a remote source external to the panel. Optical fiber panels are preferred as they offer many important benefits compared with EL panels. The remote light source can be a single lamp, easily replaced. The light intensity at the lamp source is easily varied. The panel doesn't generate heat, so X-ray film is not distorted. It is lightweight, and will produce a surprisingly high lighting level.

In one embodiment, the light panel is mounted integral with the tablet, over the electrode array, and beneath the working surface with or without the space previously described. It is preferred, however, to provide the space as an air gap generally as described above formed between a top translucent layer and the light panel.

In another embodiment, the light panel is mounted in a frame configured to fit over an existing conventional digitizer tablet construction to provide surface lighting for the tablet.

In a preferred embodiment the light panel is constructed as a thin light-weight member in essentially sheet form, mounted in a frame so that it can be assembled over the top of the digitizer tablet. The overall thickness of this surface-lining panel is such that the tablet pointing device remains within the proximity threshold of the tablet. In both of these surface-lit embodiments using a light panel, the light panel is disposed between the position-determining structure and the top working surface. Thus, the light which illuminates the top working surface does not pass through the position-determining structure. Accordingly, the position determining structure does not cause the undesirable lighting effects described above for a back-lighted digitizer tablet to appear at the working surface. Preferably, the surface-lighted version includes a clear or transparent spacer or air space between the light panel and a translucent top element, which diffuses light from the light panel to assist in providing an even distribution of light on the working surface.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

The invention is illustrated by way of example and not limitation in the figures of the accompanying drawings in which like references denote the same or corresponding parts, and in which.

DETAILED DESCRIPTION OF THE PREFERRED EMBODIMENTS

Although description of the preferred embodiments is made with respect to digitizer tablets employing electromagnetic technology, the invention is not limited to such digitizer tablets, and is applicable to digitizers employing other technologies.

Figure 1:
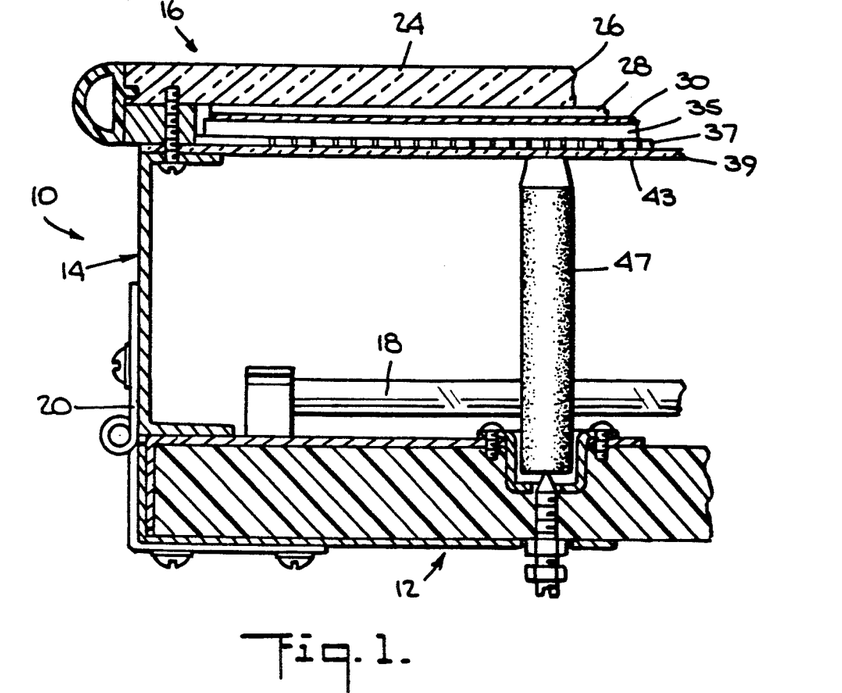
FIG. 1 is a cross section view of a portion of a back-lighted digitizer device similar to the one disclosed in the referenced U.S. Pat. No. 4,943,689.

The digitizer device 10 shown in FIG. 1 is an integrated back-lighted digitizer tablet and light source which is described in detail in the '689 patent. Device 10 comprises a base 12, lighting compartment 14 and translucent digitizer tablet 16. Fluorescent lamps 18 mounted to base 12 in lighting compartment 14 function as a light source to project light through translucent digitizer tablet 16 to back light it. Tablet 16 is hinged at 20 to base 12 so that tablet 16 may be pivoted open to expose the interior of lighting compartment 14 for servicing, e.g., replacement of fluorescent lamps 18. As described in more detail in the patent, device 10 is constructed so that working surface 24 of translucent top element 26 is illuminated by light from lamps 18 while undesirable lighting effects are prevented or minimized.

Tablet 16 includes top translucent layer 26, a clear, solid spacer element 28, a transparent printed circuit board (PCB) 30 having a grid array in the form of conductive traces of an electromagnetic grid structure on opposite sides thereof, a translucent, solid spacer 35, a perforated grid shield 37 and a clear, solid support plate 39. The functions of these parts are described briefly below and in more detail in the referenced patent.

Shield 39 is preferably made of sheet aluminum that is thick enough to be rigid, e.g. 0.05 inch thick. This allows a relatively large number of holes 43 to be provided in shield 39 so that it is substantially light transmissive, e.g. 48%, whereby a substantial percentage of the light from the lamps 20 passes through shield 39. PCB 32 is a transparent insulating board having fine grid conductors printed on opposed sides thereof. Spacer element 35, which electrically isolates the grid conductors printed on the lower surface of the PCB 30 from the shield 39, is preferably a transparent plastic, e.g., acrylic, about 0.2–0.3 inch thick, e.g., 0.22 inch. To reduce weight, a thin-walled spacer (described below) having thin sheets interconnected by vertical ribs may be used instead of a solid spacer. Spacer element 28 mounted between PCB 32 and top layer 26 is a sheet of a transparent plastic material, such as acrylic, having a thickness of about 0.07 to about 0.09 inch, e.g., 0.08 inch. Top layer 26 is a translucent plastic material, e.g., translucent acrylic, and has a thickness of between $\frac{3}{8}$ and $\frac{1}{2}$ inch, e.g., $\frac{3}{8}$ inch.

The portion of tablet 16 above PCB 30 is configured so as to defocus the shadows cast by the opaque portions of the tablet in the light path from the tubular lamps 18, and to diffuse the light as widely as possible as it passes through tablet 16.

Undesirable lighting effects may be produced at working surface 24 as a result of small spaces or gaps 45 (FIG. 2) between adjacent elements of tablet 16, or from variations or changes in the thicknesses of elements 26–39 of tablet 16. Such spaces or gaps 45 and thickness variations may be the result of imperfections or irregularities in the various elements of tablet 16, e.g., they are not perfectly flat. They may also result from flexing, sagging, warping or compression of the elements (as at 46) during assembly or use of tablet 16. For example, the elements of tablet 16 may be stressed during assembly, or they may be stressed during use in a number of ways such as from pressing the stylus or cursor against top element 26, resting heavy objects on top element 26, bending tablet 16, subjecting tablet 16 to adverse environmental conditions, from sagging of elements 26–39 due to their weight, etc.

Figure 2:
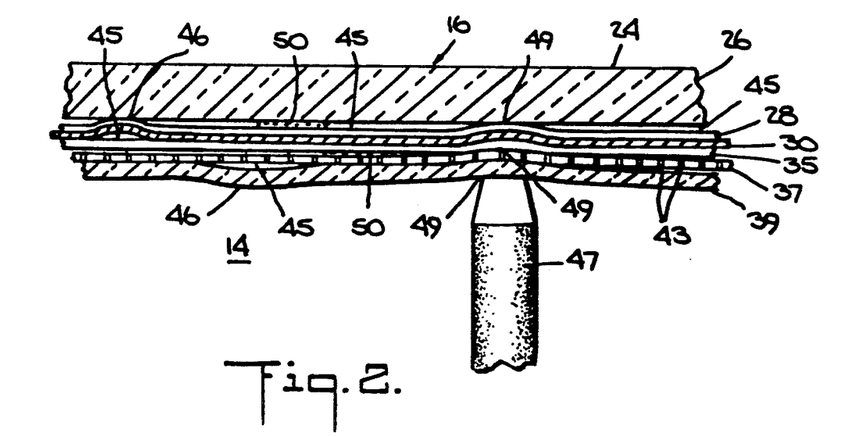
FIG. 2 is a schematic cross-section view of the tablet portion of the digitizer device of FIG. 1 illustrating causes of some undesired lighting effects.

For large tablets, e.g., having a working surface of about 36 inches by 48 inches, tablet 16 may sag from its own weight. In such large tablets, posts 47 are provided inwardly of the tablet perimeter to support tablet 16. Posts 47 are constructed to have optical characteristics (e.g. transmit light in all directions, permit light to enter and exit easily), and thereby avoid undesirable lighting effects. However, posts 47 may slightly compress or flex elements 26–39 (as at 49) when top element 26 is pressed with forces typically encountered during use of tablet 16. Flexing and/or compression of elements 26–39 reduces or eliminates the usual minute gap (not shown) between the adjacent elements, thereby modifying the optical properties of tablet 16.

FIG. 2 shows such spaces 45 and flexing, sagging, compression, etc., of elements 26-29 at 46 and 49, highly exaggerated for clarity and ease of visual presentation. As also shown in FIG. 2, spaces 45 may simply be air gaps of varying size in various locations, or they may contain liquid 50, for example, condensed moisture, or water or other liquids such as solvents and cleaning fluids which may have not completely dried during manufacture and ultimately accumulate in gaps 45. Those air gaps 45 and/or liquid 50, and flexing, compression, etc. of elements 26-39 may cause undesirable lighting effects at working surface 24, for example, uneven illumination, bright and dark spots and patterns, etc. Liquid 50 in gaps 45 between elements of tablet 16 tends to produce various bubble-shaped spots or patterns visible on working surface 24. The spots and patterns on working surface 24 from liquid 50 appear dark when the tablet is not back lighted because of non-uniform reflection and/or refraction of ambient light by the liquid and other parts of tablet 16 resulting from different indices of refraction in adjacent regions. Those spots or patterns appear bright when the tablet is back lighted because of the focussing effect of liquid 50.

Similarly, variations in the thickness of air gaps, liquid accumulations, or in laminating adhesives that are used to bond adjacent elements in a unitized tablet structure, may produce interference "fringe" or "rainbow" patterns and other unevenness in the appearance of the working surface 24. Such variations may occur during manufacture, or may be produced by stresses, flexing, etc. of the elements while the tablet is in use. Generally, smaller air gaps tend to produce dark patterns or spots when surface 24 is not back-lighted, and bright patterns or spots when it is.

While FIGS. 1 and 2 depict a tablet supported by posts 47, tablets unsupported inwardly of their perimeter and translucent tablets (without light source) may exhibit one or more of the undesired lighting effects described herein resulting from one or more of the conditions described herein.

Figure 3:
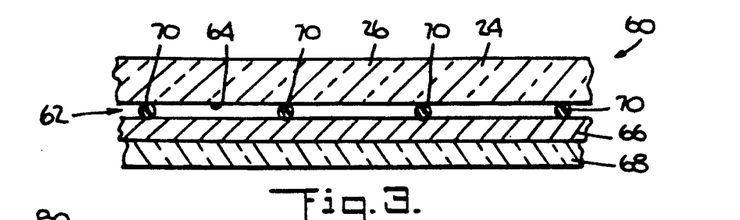
FIG. 3 is a cross-sectional schematic view of a portion of a digitizer tablet structure incorporating the invention.

In accordance with an aspect of the invention, a tablet structure 60 depicted in FIG. 3 is provided with a space in the form of an intentional air gap 62 adjacent the bottom surface 64 of top translucent layer 26, i.e., on the interior side of translucent layer 26 opposite working surface 24. Air gap 62 is provided between top translucent layer 26 and tablet element 66 which, depending upon the particular tablet embodiment, may be a grid structure, a panel-type light source, a spacer or support element, etc. The remainder 68 of the particular tablet is disposed below element 66. Details of such digitizer tablets have been omitted from FIG. 3 for clarity of presentation. Specific digitizer tablets employing an intentional air gap 62 in accordance with the invention are described below.

Intentional air gap 62 is of substantial height and large enough so that small amounts of condensed moisture which may accumulate during normal use or small amounts of other liquids not completely dried during manufacture do not completely fill air gap 62. This ensures that an air gap is essentially always provided adjacent substantially all of the bottom surface 64 of translucent layer 26. The presence of air gap 62 along substantially the entire bottom surface 66 of translucent top layer 26 prevents formation of the small air gaps 45 (FIG. 2) which may otherwise form in digitizer tablet 16 of FIGS. 1 and 2, thereby avoiding the accumulation of liquid 50 described above. Additionally, a substantially continuous air gap 62 tends to minimize the optical effects of irregularities, imperfections, flexing, etc. of top translucent element 26. Further, air gap 62 performs a diffusing function for light passing therethrough to provide a more uniform projection of light to top translucent element 26; and air gap 62 acts to defocus the optical effects of irregularities, imperfections, flexing, moisture or liquid accumulations in tablet structure below air gap 62.

The thickness of air gap 62 depends upon optical and nonoptical factors. For example, an air gap of as little as 0.060 inch adjacent a translucent acrylic top element of 0.375 inch thickness has been found to achieve the functions described above and substantially eliminate or minimize the undesirable lighting effects described above. However, an air gap having a height of from about 0.030 inch to about 1.0 inch or higher will perform the desired functions and result in substantial elimination or minimization of undesirable lighting effects from one or more of the causes described above. The size of the air gap also depends on tablet size, where the gap may increase to 1 inch or more as the tablet size increases to several feet or more. Some of the specific digitizer embodiments described below consider both optical and non-optical factors in setting air gap 62.

Referring to FIG. 3, air gap 62 is maintained by elongated spacers 70 which occupy only a small portion of the air gap. (Spacers 70 and air gap 62 are shown exaggerated in FIG. 3.) Spacers 70 are light transmissive and do not form dark or bright lines. Spacers 70 preferably transmit light in all directions and permit light to easily enter, be transmitted through and exit the respective spacer. In short, spacers 70 should appear optically not to be present.

It is preferred that spacers 70 be tubular, i.e., have a cylindrical outer surface, so as to minimize the area of contact between spacers 70 and top translucent layer 26. For example, such tubular spacers 70 will make line and/or point contacts (rather than area or surface contacts) with top translucent layer 26. This avoids the possibility that smaller air gaps, which may fill with liquid, will be formed between spacers 70 and top translucent layer 26. It is preferred that spacers 70 be transparent optical fibers or transparent, solid glass or plastic rods. Of these, optical fibers are preferred because they provide better light distribution at working surface 24 than solid rods. Also, optical fibers may be obtained in small diameters with relatively tight tolerances. However, whether optical fibers or solid rods are used may depend upon non-optical factors such as the height of gap 62 desired to satisfy optical, mechanical, electrical or assembly requirements.

Figure 4:
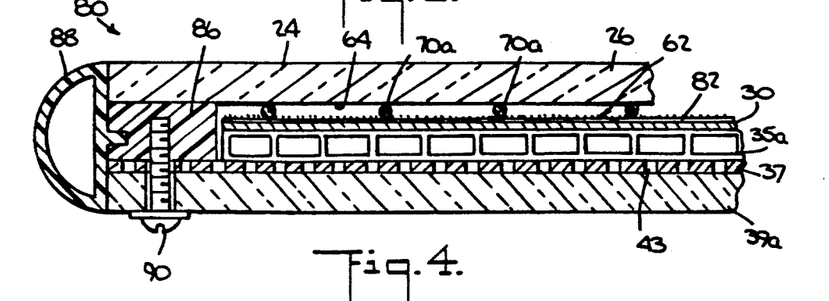
FIG. 4 is a cross-sectional view of a portion of a translucent digitizer tablet, similar to the tablet portion of the device of FIG. 1, incorporating the invention.
Figure 5:
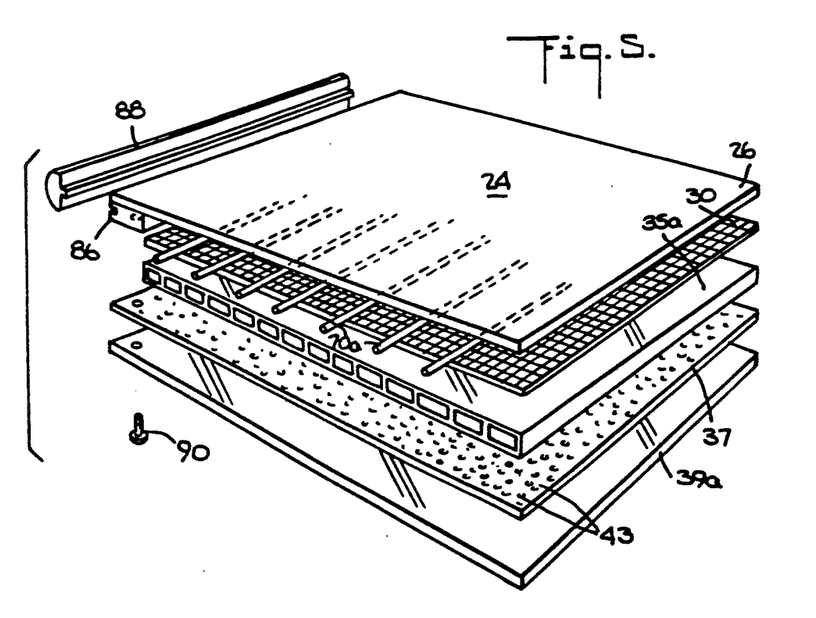
FIG. 5 is an exploded perspective view of the digitizer tablet of FIG. 4.

FIGS. 4 and 5 depict a translucent digitizer tablet 80 which incorporates an air gap 62 in accordance with an aspect of the present invention. Tablet 80 is translucent, as is tablet 16 of device 10 in FIG. 1, but does not include a light source. Rather, tablet 80 may be placed adjacent an external light source such as a light box, light table or an X-ray illuminating device (all not shown). Tablet 80 is thus similar to tablet 16, but with an intentional air gap 62 replacing solid spacer element 28 of the FIG. I tablet 16. Also, tablet 80 depicted in FIGS. 4 and 5 includes a channeled spacer sheet 35a instead of the solid spacer 35 of tablet 16 depicted in FIGS. 1 and 2.

Air gap 62 in tablet 80 is provided by optical fibers 70a supporting top translucent layer 26 (FIGS. 3 and 4). Optical fibers 70a are conventional, and are commercially available from Mitsubishi Rayon Company Ltd. under the commercial designation ESKA. Preferably, the diameter of fibers 70a for use in tablet 80, which is of relatively large size, is 0.060 inch. They are spaced about 2 inches apart, and a plurality are used. Other diameter fibers may be used, but that diameter is preferred for the present construction of tablet 80. Fibers 70a extend adjacent bottom surface 64 of top layer 26 and each thus occupies about 3% of the air gap volume between adjacent fibers. Fibers 70a have a circular outer surface that provides point or line contact with the translucent element 26, and resist compression, so as to minimize the area of the contact with the translucent top layer 26 with fibers 70a, as described above. Optical fibers 70a are preferably applied to the PCB 32 over a transparent layer of double-sided acrylic adhesive tape 82. Fibers 70a are laid in position by a jig (not shown) so that they are parallel to the Y-axis of the tablet, with their centers spaced about 2 inches apart. The double-sided acrylic adhesive tape 82 hardens after fibers 70a are in place, so as to provide a permanent bond between the PCB 30 and one side of the fibers 70a. This maintains the spacing between the fibers 70a to ensure that adequate support is provided to maintain a uniform air gap 62 between the translucent top layer 26 and PCB 30.

Alternatively, solid glass or acrylic rods of suitable diameter may be utilized.

Tablet 80 thus includes top translucent layer 26, PCB 30, and shield 37, which for purposes of the invention may be identical or nearly identical to the corresponding elements of tablet 16. As mentioned above, spacer 35a is a channeled member, but could be identical to solid spacer 35 of tablet 16. Translucent bottom support 39a may be made of the same transparent acrylic material as support 39 of tablet 16, but is thicker (e.g. 0.625 to 1.0 inch) because tablet 80 is a self-contained unit and requires more rigidity and support than tablet 16 which is hinged to lighting compartment 14.

The height of air gap 62 between the translucent top layer 26 and PCB 30 is selected as described above to be large enough to help defocus images projected from lower layers, and to prevent liquid from locally bridging the distance between the translucent top layer 26 and PCB 30, which would otherwise compromise the defocusing effect of the air gap. It has surprisingly been found that the use of tubular spacers 70a to maintain this particular air gap between the translucent top layer 26 (0.375 thickness) and an underlying element prevents the spotted appearance described above, without sacrificing the defocusing and diffusing effects previously provided by a solid spacer 28, and without producing line images on working surface 24.

Tablet 80 is also different from tablet 10 in that the translucent top layer 26 is held against fibers 70a by an acrylic frame 86 that is solvent bonded to bottom surface 64 of element 26 along the perimeter thereof. The sides of tablet 80 are protected from mechanical damage and the shield 37 is electrically insulated by a semi-circular flexible bumper 88 fixed to ABS plastic frame 86. Screws 90 fasten base 39a to frame 86, which with top layer adhered to frame 86, produces a sandwich structure holding the various elements together.

As mentioned above, in the embodiment shown in FIGS. 4 and 5, a rigid, square-channeled sheet of extruded TWIN-WALL plastic sheet 35a is used in place of the solid sheet 35 shown in FIGS. 1 and 2. This extruded sheet is particularly advantageous since tablet 80 is used independently as a self-contained digitizer tablet. For example, tablet 80 may be placed over a light source such as a conventional light box or X-ray displayer. Alternatively, tablet 80 and/or such light sources may be modified so that tablet 80 may conveniently be used with such light sources.

Thus, tablet 80 because of its structural stability permits it to be used without additional rim or housing structures. Tablet 80 is a highly compact, streamlined unit that can be placed directly on existing lighted surfaces, making it a convenient unit for use in retrofitting existing light tables and boxes and X-ray displays. Thus, translucent tablet 80 is portable and can be used as a removable, optional accessory for such light devices. Clips, pins, etc., and other structure may be employed to fasten the tablet to such existing light devices.

If desired, a control module (not shown) containing amplifiers and position direction circuitry may be provided externally of tablet 80, and to which a stylus and/or cursor may be connected. This reduces the thickness and complexity of tablet 80. Such control modules are currently in use on back-lighted digitizer tablets of the assignee of this application. Thus, the control module reduces the bulk of the tablet 80 without sacrificing accuracy or software compatibility. In particular, such a control module provides the local signal processing that is needed for noise immunity, as well as for accurate signal detection and interpretation. The control module also provides a standardized computer interface communication controller so that the coordinate valves and other probe signals provided by tablet 80 may be input directly to a computer and storage devices via a standard modem.

Figure 6:
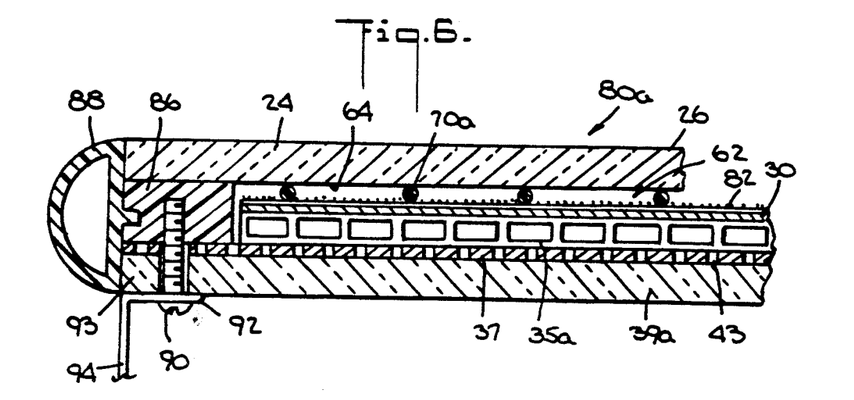
FIG. 6 is a cross-sectional view of a portion of the tablet of FIG. 4 including structure for mounting it to a light box.

Referring next to FIG. 6, tablet 80a is similar to tablet 80, except that it includes structure for hinging it to a light compartment 14 in generally the same way as tablet 16 is fastened to lighting compartment 14. Such structure includes a flanged portion 92 of the lighting compartment sidewall 94 on which an edge 93 of tablet 80a rests. A plurality of screws 90 fasten the edge of tablet 80a to flanged portion 90. Element 39a may be thinner since tablet 80a is fixed to light compartment 14, i.e., element 39a may be replaced by element 39 of FIGS. 1 and 2.

Figure 9:
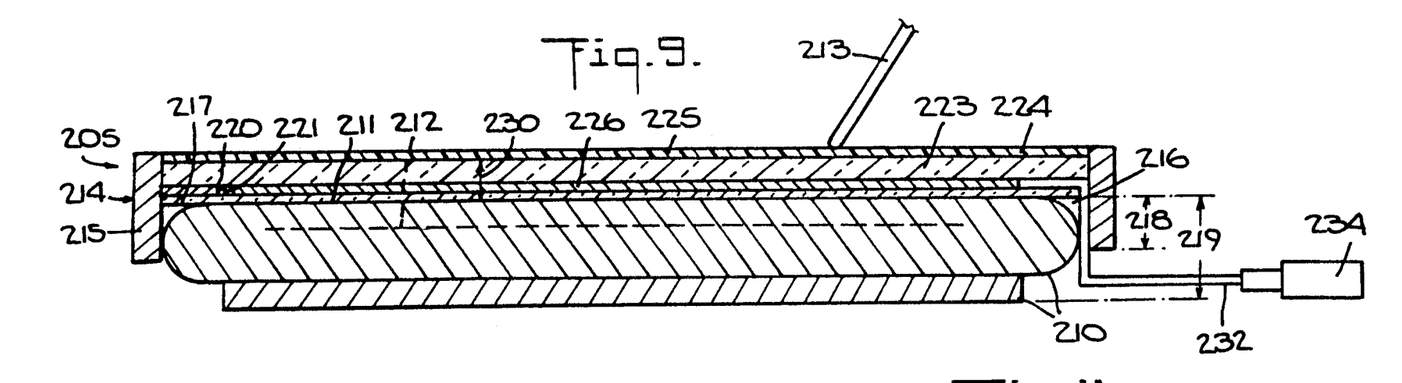
FIG. 9 is a generally cross-sectional view of another form of surface lighted digitizer in accordance with the invention.
Figure 10:
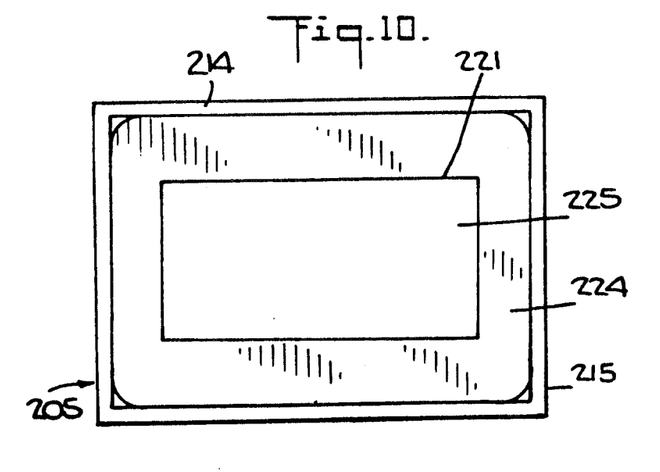
FIG. 10 is a plan view from the top of the digitizer of FIG. 9.
Figure 11:
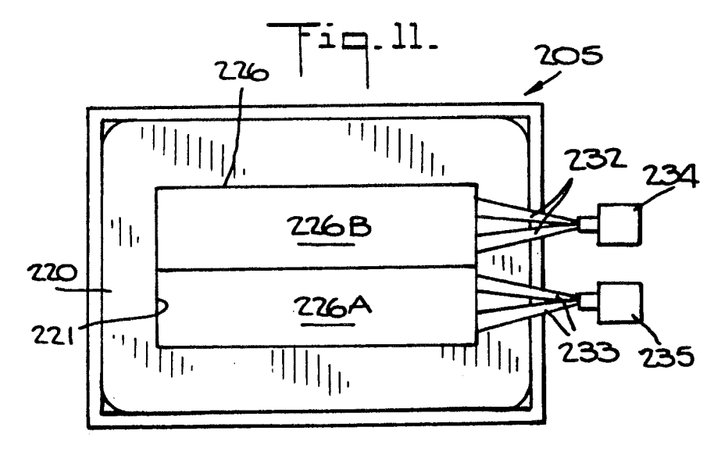
FIG. 11 is a plan schematic view showing the arrangement of a light panel for use with the digitizer of FIG. 9.

FIGS. 9-11 relate to a digitizer tablet employing a light panel positioned above a conventional digitizer tablet represented by the reference numeral 210. It has no lighting means associated with it. The surface of this tablet is referenced 211 and beneath that surface, shown only schematically at 212, is an electrode array as commonly employed in such digitizers. Examples, which are not to be considered as limiting, are described in commonly-assigned U.S. Pat. Nos. 3,735,044; 3,904,822; and 4,788,386. A stylus which is electrically connected or plugged into the tablet 210, is shown schematically at 213. Between the stylus 213 which is operated by the user and the actual tablet surface 211 is provided a device 205 for surface lighting. The device 205 comprises a frame 214 including an annular wall 215 defining an interior opening 216 which is dimensioned to fit over the tablet 10 as shown. The frame is closed off on top by a thin, light transparent, support member 217. As will be observed, the height of the wall indicated by 218 in FIG. 1 is shorter than the thickness of the tablet 10 indicated by 219, so that the lighting source 205 rests on the tablet surface 211, which is typically planar. Mounted over the top support 217 is an opaque frame member 220 having a central opening 221 which defines the active area of the tablet surface. By active area is meant the area in which positions of the stylus will generate X, Y coordinate data within the tablet's specifications. Mounted over the opaque frame 220 is a clear layer 223 on top of which is mounted an outer thin layer of translucent material 224. The outer surface 225 of the translucent layer becomes the new working surface on which the stylus 213 is placed and whose location is indicated by the electrical output of the tablet 10.

In the area within the opening 221 of the opaque frame 220 is mounted a light panel 226. The light panel 226 may be a fiber optics light panel or an electroluminescent panel which are commercially available. The panel 226 is fitted into the frame opening 221 so it is coextensive with the active tablet area.

Preferably, light panel 226 is a fiber optics light panel. Such panels are known in the art and are available from Lumitex, Inc., and comprise a panel made up of woven acrylic optical fibers. The panel is woven so that the maximum amount of light possible is emitted along the entire panel surface, which preferably is coextensive with the active area or working surface of the table. A translucent filament weft aids in diffusing the light so it is uniform over the panel surface. Any color desired is possible by providing suitable filters, and the light intensity is controllable through the use of conventional electrical dimmer controls. Such fiber optic panels emit no heat or other radiations requiring the use of shielding. Hence, heat-sensitive film or other drawing media can be placed directly over the panel without fear of distortion during digitization. Such devices typically cooperate with a low voltage light source, such as an incandescent or halogen bulb, which is optically coupled to the fibers and is provided as a package with the woven panel. Typically only five-ten volts DC is required to operate the light source. A variable intensity light source is readily obtained with a light dimmer. Moreover, the light source is remote from the panel and easily replaced when necessary. Such fiber optic panels are commercially available in sizes large enough to cover a small tablet active area, for example, 12×12 inches, or 17×24 inches. In the case of larger tablets, two panels can be placed side by side. Surprisingly, the optical fiber panels though thin and lightweight produce a brighter light than even fluorescent tubes.

FIG. 11, which is a top view of the assembly with the layers 223 and 224 removed, shows a two panel layout. The two rectangular fiber optic panels 226a, 226b are laid side-by-side inside the recess 221. Fiber bundles 232, 233 connect the panels to their respective light sources or lamps 234, 235. Two light sources can also be connected to one panel. The bundles 232, 233 can be passed as shown in FIG. 9 through a recess to the outside. More than two panels can be provided if necessary to cover larger areas. The light source for the panel and the voltage converter (110 volt AC line to 5 volt DC or any other suitable value) can be mounted at the side of the frame, or may be unmounted as shown in FIG. 9. As will be noted, the light source is connected by a bundle of fibers which fan out to form the wide-area panel 226.

In the fiber optic light panel embodiment above described, which is the presently preferred embodiment of this aspect of the invention, the light source, usually an incandescent bulb, is remote from the panel. In the electroluminescent light panel embodiment, the light source is the electroluminescent material itself, which exists throughout the panel. The only external connections to the electroluminescent light panel are two wires which are connected to a power source. A voltage converter, which may be necessary to connect from 110 volts AC to about 250 volt AC, may be mounted on the outside of the frame 14.

The lighting panel of this aspect of the invention is a self-contained unit which simply fits over and rests on an existing tablet surface. Since the surface of the latter is flat, and the surface of the frame member 217 is also flat, the assembly of lighting device 205 and tablet 210 is very stable, and the user will have no trouble in using the surface 225 of the lighting device 205 in the same manner that he previously used the tablet surface 211. There need be no mechanical or electrical connection between the lighting device 205 and the tablet 211, and the lighting device 205 can be used with any tablet that will fit within the opening 216. Each lighting device may have to be customized for each model of tablet, since the latter come in all sizes and shapes.

A requirement of the self-contained lighting panel is a maximum distance between the working surface 225 of the lighting panel and the tablet surface 211, indicated in FIG. 9 by numeral 230. As mentioned, when the stylus 213 is raised to a level above the tablet surface 211 exceeding its maximum stylus proximity—the so-called out-of-proximity threshold—, the tablet stops generating coordinate data. Since a common use of tablets is to provide digital signals representing a drawing, which itself has a certain thickness, it is essential that the height of the working surface 225 over the tablet surface 211 be maintained at the smallest possible value. Since typical tablet maximum proximity values range from $\frac{1}{8}$ to $\frac{1}{2}$ inch, in accordance with a further aspect of the invention, the thickness 230 of the self-contained lighting panel is maintained at 7/16 inch or less, preferably $\frac{3}{8}$ inch or less. This can be obtained with the fiber optic and electroluminescent light panels. Specifically, fiber optic light panels are available in thickness ranging from 0.050–0.125 inch from Lumitex and electroluminescent panels are available also from Lumitex in thicknesses of 0.032 inch.

To maintain the overall thickness 230 at 7/16 inch or less requires that the combined thickness of the thin support 217, the transparent layer 223, and the translucent layer 224 be approximately 5/16 inch or less. In a preferred embodiment, the support 217 is constructed of a sheet of acrylic plastic, having a thickness of 1/16 inch; the clear layer 223 is a sheet of acrylic plastic, with a thickness of 7/32 inch; and the translucent layer 224 is a sheet of acrylic plastic, with a thickness of 1/16 inch. The fiber optic panel has a thickness of 3/32 inch, and the layer 220 is constructed to have a similar thickness. The resultant construction, assembled with adhesives, was firm and solid, and had an overall thickness of 7/16 inch. It weighed only about 10 pounds for a 17"×24" digitizer. The working surface 225 was uniformly illuminated to a level substantially equal to that of conventional backlit digitizers. A rectangular outline, shown at 231, was marked on the surface 25 to indicate to the user the active tablet area.

The clear (transparent) and translucent sheets 223, 224 assist in spreading and diffusing the light from the panel source 26 uniformly over the working surface 225. Any unevenness in the panel 226, or coloring or grid lines in an electroluminescent panel, are diffused out over the working surface and do not affect its use.

The optical nature of the two sheets and their relative thickness play a significant role in improving the light diffusion. Preferably, the top layer 224 is relatively thin and translucent, and the layer 223 underneath is relatively thick and clear or transparent. In the example given, the clear layer is about three times thicker than the translucent layer on top. The interface between the two layers 223, 224 and its location increase diffusion of the light coming up from below, which results in a more even or uniform illumination of the working surface 225. It will be evident that other materials with similar optical characteristics can be substituted for the acrylic plastics of the example given.

Figure 7:
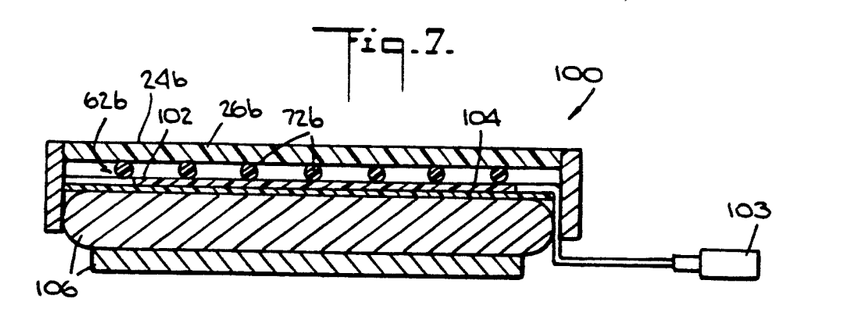
FIG. 7 is a cross sectional view of a portion of a surface lighted digitizer tablet incorporating the invention.

Referring next to FIG. 7, a modified form of the surface lighted digitizer of FIGS. 9-11 which also incorporates the space feature of the present invention is depicted. Digitizer tablet 100 is similar to the surface lighted digitizer tablet described above, except that an intentional air gap 62b, between a lighting panel 102 and a top translucent element 26b, replaces a solid transparent element. Air gap 62b is provided by at least one transparent acrylic spacer rod 72b having a diameter of 0.250 inch. As indicated above, rods 72b of other diameters may be utilized. Alternatively, fiber optic spacers 72a of appropriate diameter may be utilized. Rods 72b may be adhered to top translucent layer 26b as described above for tablet 80. Light panel 102 may be an electroluminescent panel, or a fiber optic panel, connected to a light source 103 as described in connection with FIGS. 9-11.

Typical dimensions for the air-gap version include a translucent acrylic top layer 26b of about 5/16 inch thickness, a 0.250 inch thick air gap 62b, 0.250 inch diameter acrylic spacer rods 72b, fiber optic panel 102 of about 3/32 inch thickness, a panel support 104 in the form of a transparent sheet of acrylic of 1/16 inch thickness, and conventional tablet structure referenced generally 106. Tablet 100 may be assembled using adhesives to form a rigid tablet.

Figure 8:
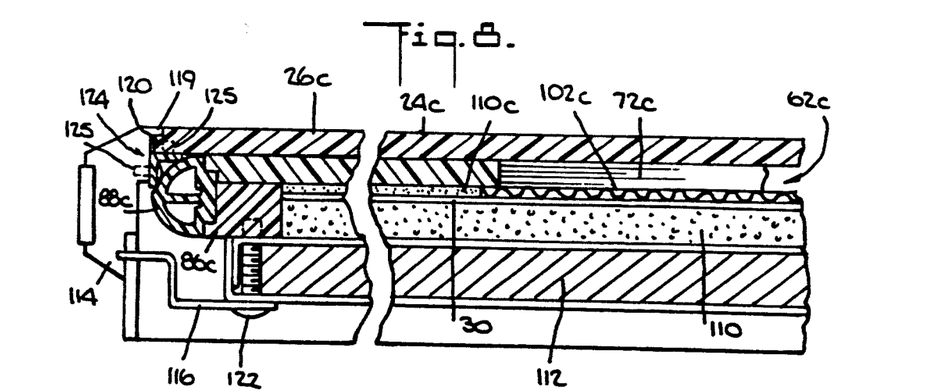
FIG. 8 is a cross-sectional view of a portion of another embodiment of a surface-lighted digitizer tablet incorporating the invention.

FIG. 8 depicts a presently preferred embodiment of a surface-lighted digitizer tablet having a 17 inch×24 inch active area incorporating the present invention. The tablet comprises: a translucent acrylic top element 26c of 0.250 inch thickness; an air gap 62c of 0.250 inch thickness provided by two transparent acrylic spacer rods 72c (shown in side view) of 0.250 inch diameter spaced about 6 inches apart; an acrylic fiber optic light panel 102c of 0.250 inch thickness commercially available in the form of a woven optical fiber panel from Lumitex Inc.; a PCB 30 which may be similar or identical to that described above; a flexible foamed plastic element 110c of 0.220 inch thickness to insulate and space PCB 30, and a base 112 of a laminated honeycomb material e.g. NORCOR, of 0.625 inch thickness. Base 112 is rigid to provide support for tablet 100c. A foamed plastic 110c is provided for weight reduction and to accommodate variations in the surface of PCB 30. Foam 110c acts as a spacer to accommodate fiber optic panel 102c. A honeycomb structure is provided for base 112 because such structures are relatively rigid yet relatively lightweight. The foregoing components are held together by an extruded plastic frame 114 and a mounting bracket 116. Bracket 116 is screwed to base 112 and is engaged in a slot of frame 114. Frame 114 and top element 26c have mating shoulders 119,120 which engage when screw 122 is tightened to base 112. Another bracket 124 and screws 125 secure top layer 26 to frame 114. An opaque rigid "block out" sheet 126 of ABS plastic occupies gap 62 in the marginal area outside the active area of the tablet. Part 88c, similar to bumper 88, and frame 86c, similar to frame 86, are secured together and to block out sheet 126. Thus, bracket 116 and frame 114 when fastened together interlock the various digitizer elements together to form a unitized tablet structure. If desired, various elements of the tablet may be fastened, bonded or laminated together by known techniques.

The surface-lit embodiments disclosed of the retrofitted type as illustrated in FIGS. 7 and 9 show a version of the tablet of the invention with an air space (62b in FIG. 7) or with a solid spacer (223 in FIG. 9) under the top translucent layer. The light-panel integrated surface-lit embodiment shown in FIG. 8 also includes a version with an air space 62c. While the air space embodiments of FIGS. 7 and 8 are preferred, the air space 62b, 62c with fiber spacers 72b, 72c may be replaced with a solid spacer in the same manner as the retrofitted embodiments.

While the fiber optic panel embodiment is preferred for the reasons given, there may be situations where an electroluminescent (EL) panel might be preferred. Sandwiching the fiber-optic panel between the electrode array and pointing device is normally not a problem, because that panel carries only light waves. An EL panel generates fields due to the AC voltage that has to be applied across the panel to excite the active material into luminescence. When an EL panel is disposed adjacent the electrode array or grid used for position determination, the field generated by the EL panel can cause undesirable interference with digitizer signals. Such interference may be eliminated or reduced to an acceptable level using a shield between the EL panel and the electrode array, or by utilizing different, non-interfering frequencies in the EL panel and the digitizer. For tablets expected to be sold at low prices, the cost of an EL panel and shield may be less than that of the fiber optic panel without a shield. This is an example of an application in which the EL panel may be the panel of choice.

Certain changes and modifications of the embodiments of the invention herein disclosed will be readily apparent to those of skill in the art. Moreover, uses of the invention other than in digitizer tablets will also be readily apparent to those of skill in the art. For example, the invention is not limited to digitizer tablets that are back or surface lighted, as light for illuminating the tablet working surface may be supplied by means other than those disclosed herein. Spaces other than air gaps may be provided, and they may be formed in ways other than those described herein, and they may be positioned in areas of a tablet structure other than those specifically illustrated. Also, the various layers and elements may be adhered in sandwich or laminations other than as described herein. It is the applicants' intention to cover by the claims all such uses and all those changes and modifications which could be made to the embodiments of the invention herein chosen for the purposes of disclosure which do not depart from the spirit and scope of the invention.

What is claimed is:

1. A digitizer tablet structure having a working surface which may be illuminated, comprising:
 a light-transmitting layer one surface of which is said working surface;
 a position determining structure generally coextensive with said working surface and which cooperates with a pointing device movable on or adjacent said working surface when at least one of said position determining structure and said pointing device is energized to generate signals representative of the position of said pointing device with respect to said working surface;

said digitizer structure being configured to project light from a source to and through said light-transmitting layer without passing through said position determining structure to illuminate said working surface.

2. The digitizer tablet structure of claim 1 wherein said light-projecting portion of said light source comprises a thin panel.

3. The digitizer tablet structure of claim 2 wherein said panel is a fiber optic panel.

4. The digitizer tablet structure of claim 2 wherein said panel is an electroluminescent panel.

5. The digitizer tablet structure of claim 1 wherein said light source has a light-projecting portion disposed between said position determining structure and said light-transmitting layer.

6. The digitizer tablet structure of claim 5 including means for joining said light-transmitting layer and said light-projecting portion into a first unit, and means for forming a second unit comprising said position determining structure, said first unit being structured to fit over and be usable with said second unit such that said working surface of said first unit functions as a working surface for position determination thereon in cooperation with said second unit.

7. The digitizer tablet structure of claim 5 including means for joining said light-transmitting layer, said light-projecting portion and said position determining structure into a single unit.

8. A digitizer tablet structure having a working surface which may be illuminated, comprising:
 a light-transmitting layer one surface of which is said working surface;
 a position determining structure generally coextensive with said working surface and which cooperates with a pointing device movable on or adjacent said working surface when at least one of said position determining structure and said pointing device is energized to generate signals representative of the position of said pointing device with respect to said working surface; and
 means for illuminating said working surface comprising means disposed between said position-determining structure and said light-transmitting layer for projecting light to and through said light-transmitting layer to illuminate said working surface.

9. The digitizer tablet structure of claim 8 comprising means for joining said light-transmitting layer, said light-projecting means and said position determining structure into a single unit.

10. The digitizer tablet structure of claim 8 wherein said light projecting means comprises a thin panel.

11. The digitizer tablet structure of claim 10 wherein said panel is a fiber optic panel.

12. The digitizer tablet structure of claim 10 wherein said panel is an electroluminescent panel.

13. A tablet-type structure having a first outer generally flat surface which may function as a working surface, comprising:
 a first light-transmitting layer one surface of which is said first outer surface;
 a thin panel disposed adjacent said first light-transmitting layer for projecting light to and through said first light-transmitting layer to illuminate said first outer surface;
 means for joining said first light-transmitting layer and said panel into a unit having said first and second opposed outer surfaces;
 another light-transmitting layer between said panel and said first light-transmitting layer.

14. The tablet-type structure of claim 13, wherein said panel is a fiber optic panel.

15. The tablet-type structure of claim 13, wherein said panel is an electroluminescent panel.

16. A digitizer comprising:
 a digitizer tablet having a generally planar top surface and electrodes extending substantially in a plane parallel to and below said surface, said electrodes defining substantially an active rectangular area aligned with X and Y axes of a rectangular coordinate system,
 a pointing device connected to the tablet and cooperating with the electrodes, when activated, to generate electrical signals representative of X and Y coordinate positions of the location of the pointing device with respect to said active area,
 means for surface lighting the tablet comprising:
  i. a flat light projecting structure extending over and substantially coextensive with the tablet active area,
  ii. a flat optically transparent or translucent layer over and substantially covering said light projecting structure, said pointing device being movable on or over the surface of the flat layer remote from the tablet surface.

17. A digitizer comprising:
 a digitizer tablet having a generally planar top surface and electrodes extending substantially in a plan parallel to and below said surface, said electrodes defining substantially an active rectangular area aligned with X and Y axes of a rectangular coordinate system,
 a pointing device connected to the tablet and cooperating with the electrodes, when activated, to generate electrical signals representative of X and Y coordinate positions of the location of the pointing device with respect to said active area,
 means for surface lighting the tablet comprising:
  i. a flat light projecting structure extending over and substantially coextensive with the tablet active area,
  ii. a flat optically transparent or translucent layer over and substantially covering said light projecting structure, said pointing device being movable on or over the surface of the flat layer remote from the tablet surface,
 said tablet having a given proximity threshold value determining the maximum distance the pointing device can be positioned from the tablet surface before the digitizer stops generating coordinate data, the thickness of the surface lighting means over the tablet active area being smaller than said maximum distance.

18. A digitizer as claimed in claim 17, wherein the maximum distance is of the order of one-half inch, and the surface lighting means thickness is less than about one-half inch.

19. A digitizer as claimed in claim 16, wherein the overall thickness of the light projecting structure is less than the overall thickness of the tablet.

20. A digitizer as claimed in claim 19, wherein the surface lighting means has a bottom planar surface, the tablet has a top planar surface, and the lighting means rests on the top tablet surface with its bottom planar surface resting on the tablet top planar surface.

21. A digitizer comprising:
   a digitizer tablet having a generally planar top surface and electrodes extending substantially in a plan parallel to and below said surface, said electrodes defining substantially an active rectangular area aligned with X and Y axes of a rectangular coordinate system,
   a pointing device connected to the tablet and cooperating with the electrodes, when activated, to generate electrical signals representative of X and Y coordinate positions of the location of the pointing device with respect to said active area,
   i. a flat light projecting structure extending over and substantially coextensive with the tablet active area,
   ii. a flat optically transparent or translucent layer over and substantially covering said light projecting structure, said pointing device being movable on or over the surface of the flat layer remote from the tablet surface,
   the overall thickness of the light projecting structure being less than the overall thickness of the tablet,
   the surface lighting means comprising a frame member and an apertured member having an aperture substantially coextensive with the tablet active area, said light projecting structure being panel-like and being seated in the aperture, said flat optically transparent or translucent layer being an optically-diffusing sheet disposed over the top of the apertured member and covering the panel-like structure,
   the surface lighting means having a bottom planar surface, the tablet having a top planar surface, and the surface lighting means resting on the top tablet surface with its bottom planar surface resting on the tablet top planar surface.

22. A digitizer as claimed in claim 21 wherein the panel-like structure is a flat woven panel of optical fibers, said surface lighting means including a light source transmitting light to said flat woven panel.

23. A digitizer tablet having a working surface which may be illuminated, comprising:
   a light-transmitting layer one surface of which is said working surface;
   a position determining structure generally coextensive with said working surface and which cooperates with an object movable on or adjacent said working surface when at least one of said position determining structure and said movable object is energized to generate signals representative of the position of said movable object with respect to said working surface;
   a fiber optic panel substantially coextensive with said working surface for illuminating said working surface.

24. The digitizer tablet of claim 23, wherein said fiber optic panel is located on the side of said position determining structure remote from said working surface.

25. The digitizer tablet of claim 24, wherein said fiber optic panel is located between said position determining structure and said light-transmitting layer.

26. The digitizer tablet of claim 23, further comprising an external light source, and an optical cable connecting the light source to the panel.

27. The digitizer tablet of claim 26, further comprising means for controlling the intensity of said light source.

28. A digitizer tablet structure having a first surface which may be illuminated, comprising:
   a light-transmitting layer one surface of which is said first surface;
   a position determining structure generally coextensive with said first surface and which cooperates with an object movable on or adjacent said first surface when at least one of said position determining structure and said movable object is energized to generate signals representative of the position of said movable object with respect to said first surface;
   means for illuminating said first surface comprising a fiber optic panel disposed between said position-determining structure and said light transmitting layer for projecting light to and through said light-transmitting layer to illuminate said first surface.

* * * * *